US012485429B2

(12) United States Patent
Baeck et al.

(10) Patent No.: US 12,485,429 B2
(45) Date of Patent: Dec. 2, 2025

(54) DUST COLLECTING FILTER

(71) Applicant: LG ELECTRONICS INC., Seoul (KR)

(72) Inventors: Seungjae Baeck, Seoul (KR); Jungryun Lee, Seoul (KR); Okchun Hyun, Seoul (KR); Hyoseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 278 days.

(21) Appl. No.: 18/016,729

(22) PCT Filed: Jul. 26, 2021

(86) PCT No.: PCT/KR2021/009663
§ 371 (c)(1),
(2) Date: Jan. 18, 2023

(87) PCT Pub. No.: WO2022/019730
PCT Pub. Date: Jan. 27, 2022

(65) Prior Publication Data
US 2023/0285984 A1 Sep. 14, 2023

(30) Foreign Application Priority Data
Jul. 24, 2020 (KR) ........................ 10-2020-0092070

(51) Int. Cl.
*B03C 3/45* (2006.01)
*B03C 3/08* (2006.01)
*B03C 3/60* (2006.01)

(52) U.S. Cl.
CPC .................. *B03C 3/45* (2013.01); *B03C 3/08* (2013.01); *B03C 3/60* (2013.01)

(58) Field of Classification Search
CPC ........... B03C 3/014; B03C 3/08; B03C 3/155; B03C 3/32; B03C 3/368; B03C 3/45; B03C 3/47; B03C 3/60
See application file for complete search history.

(56) References Cited

U.S. PATENT DOCUMENTS 3,912,467 A 10/1975 Trump et al.
8,357,233 B2 * 1/2013 Chan ......................... B03C 3/08 96/81
2008/0047434 A1 * 2/2008 Kobayashi ................ B03C 3/08 96/98

FOREIGN PATENT DOCUMENTS

EP 1434013 6/2004
KR 10-2016-0028294 3/2016
KR 10-2057177 12/2019

OTHER PUBLICATIONS

International Search Report dated Nov. 23, 2021 issued in Application No. PCT/KR2021/009663.

* cited by examiner

*Primary Examiner* — Sharon Pregler
(74) *Attorney, Agent, or Firm* — KED & ASSOCIATES, LLP

(57) ABSTRACT

The present invention relates to a dust collecting filter. The dust collecting filter of the present invention may include a ground electrode unit bent in a corrugated shape to form a plurality of bent portions and a plurality of flat portions between each of the plurality of bent portions, and grounded; and a plurality of voltage electrode units disposed between each of the plurality of flat portions and spaced apart from each other, and to which a high voltage is applied.

8 Claims, 7 Drawing Sheets

【FIG. 1】
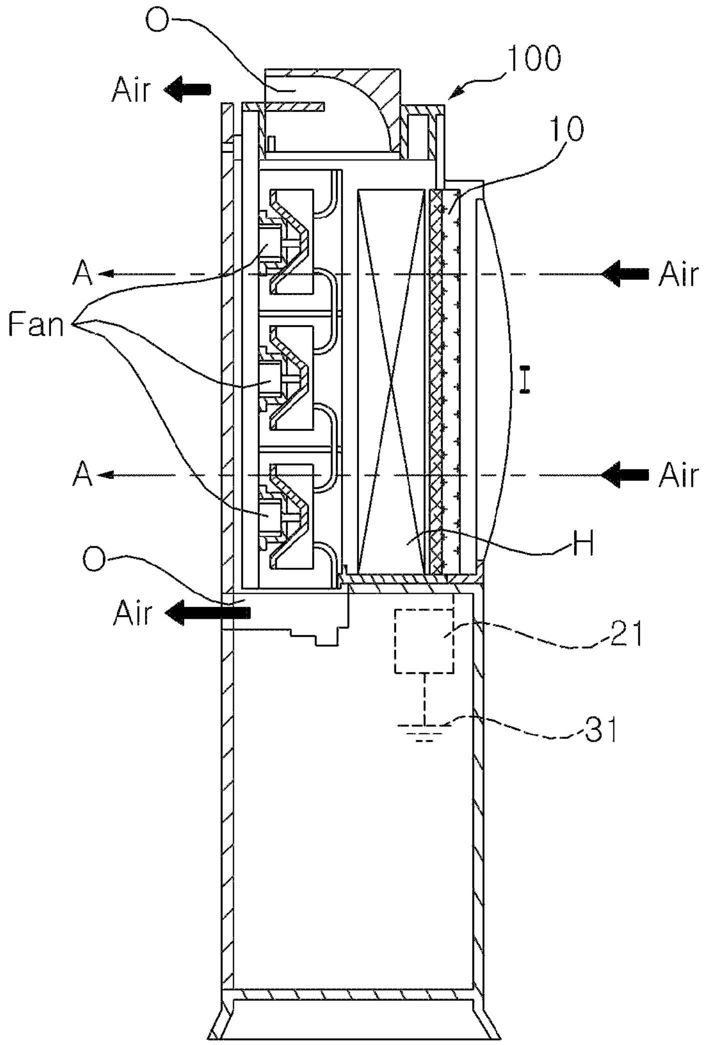

【FIG. 2】
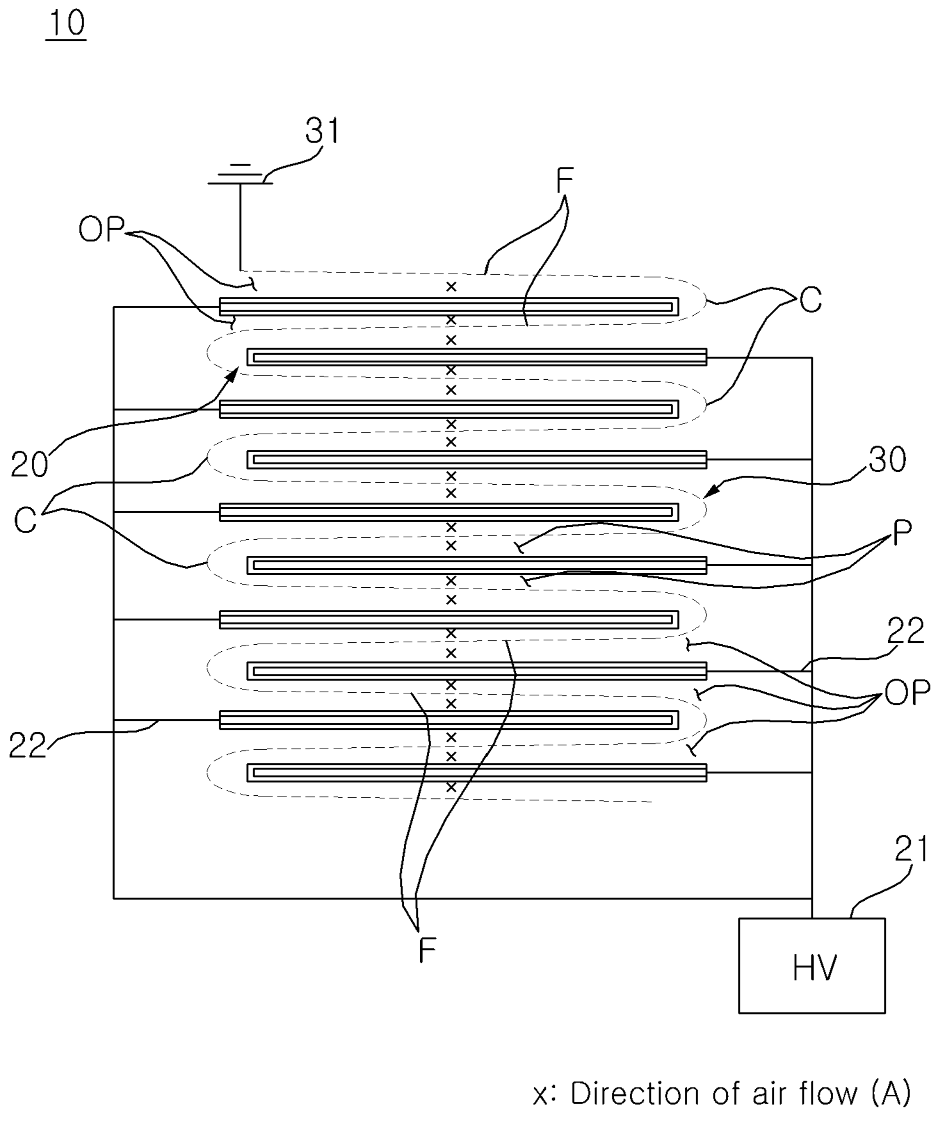

【FIG. 3】
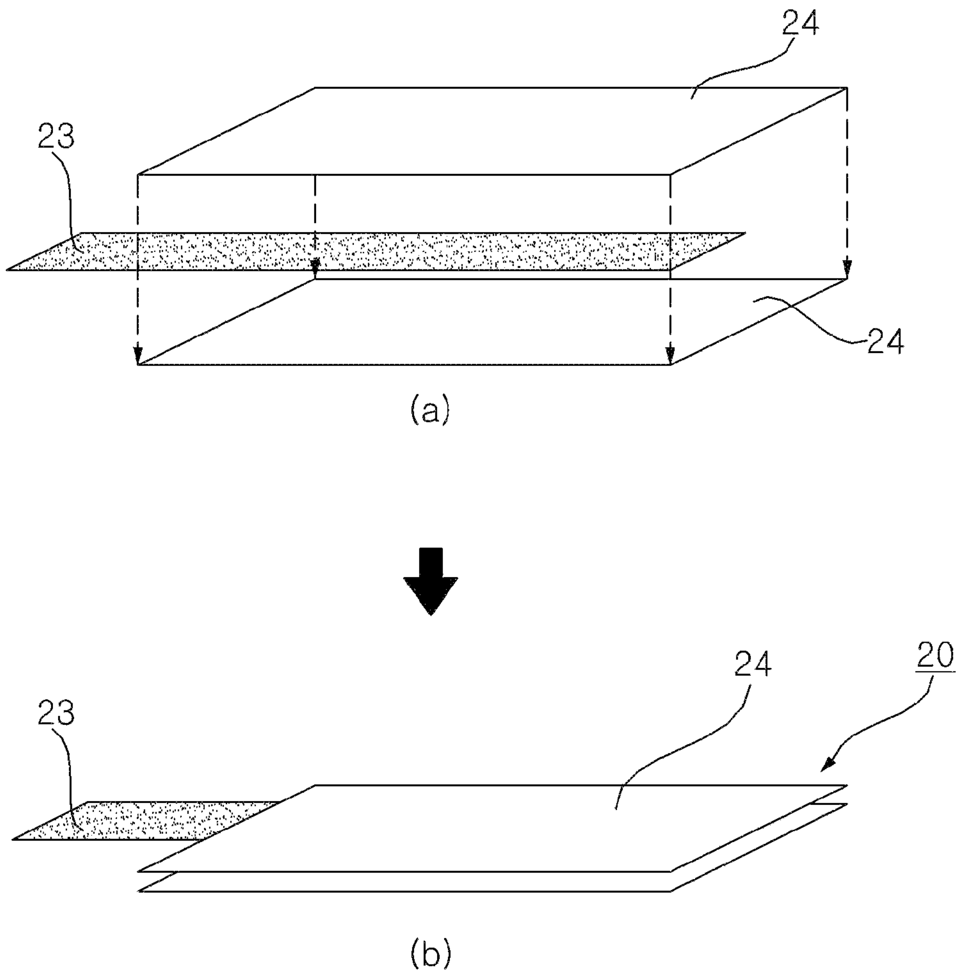

【FIG. 4】
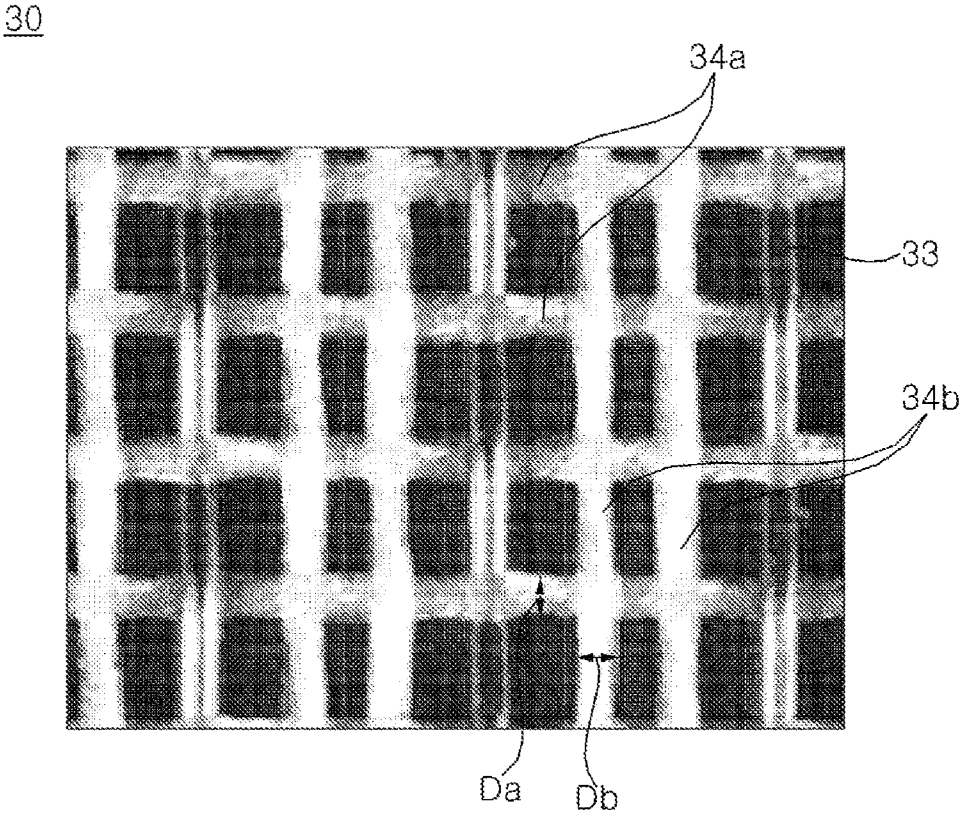

【FIG. 5】
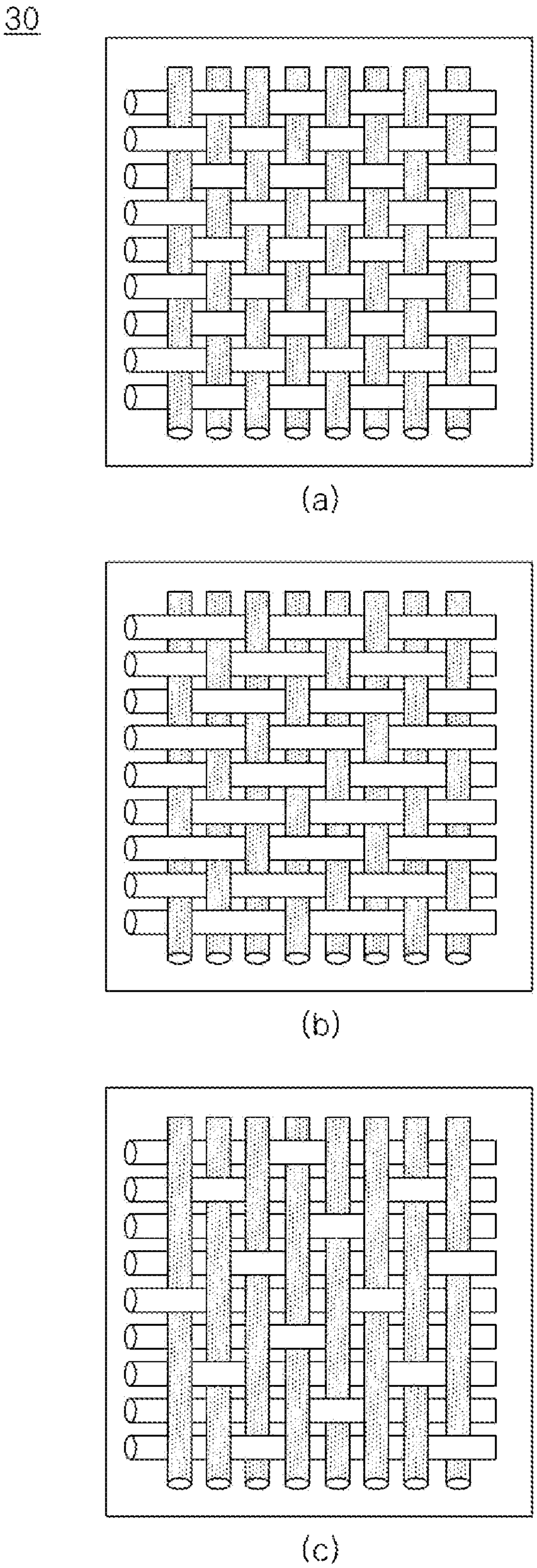

【FIG. 6】
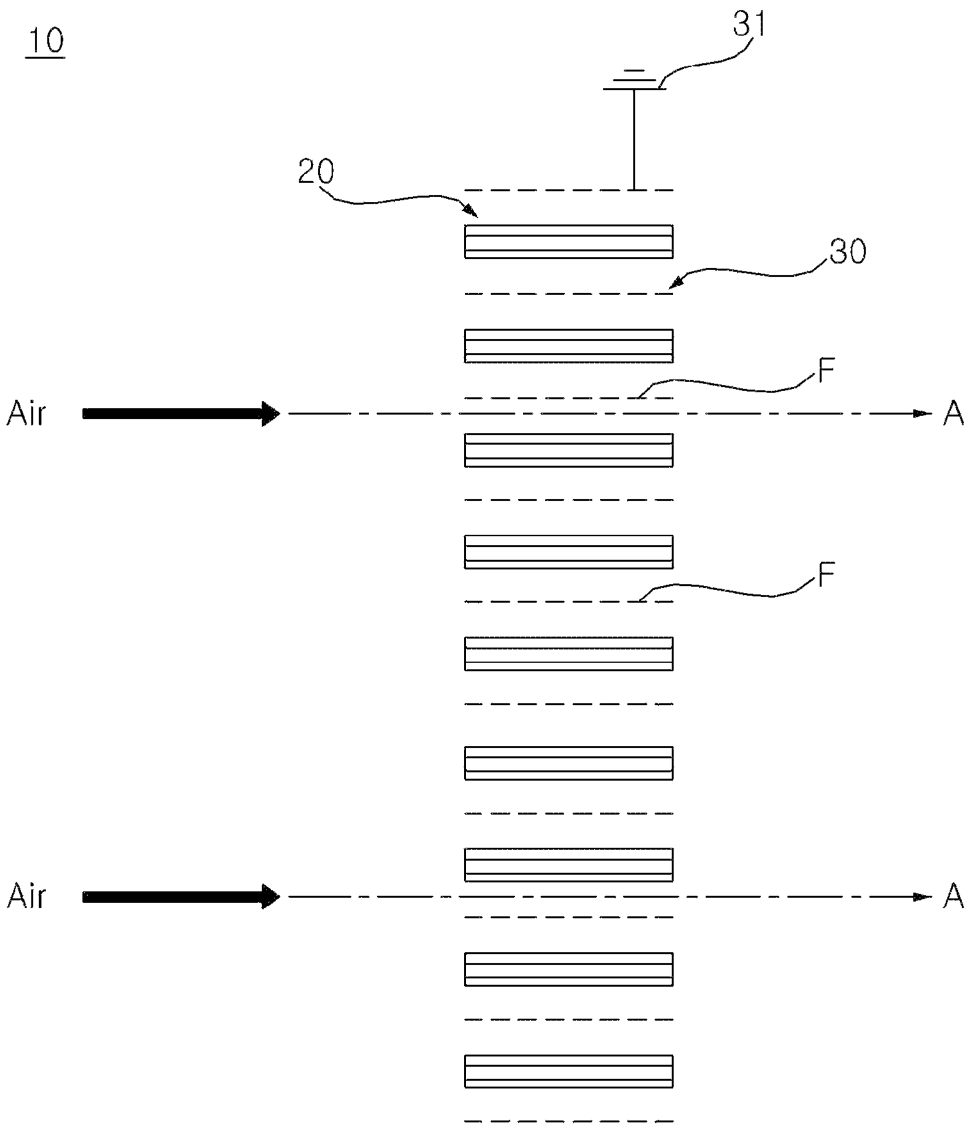

【FIG. 7】
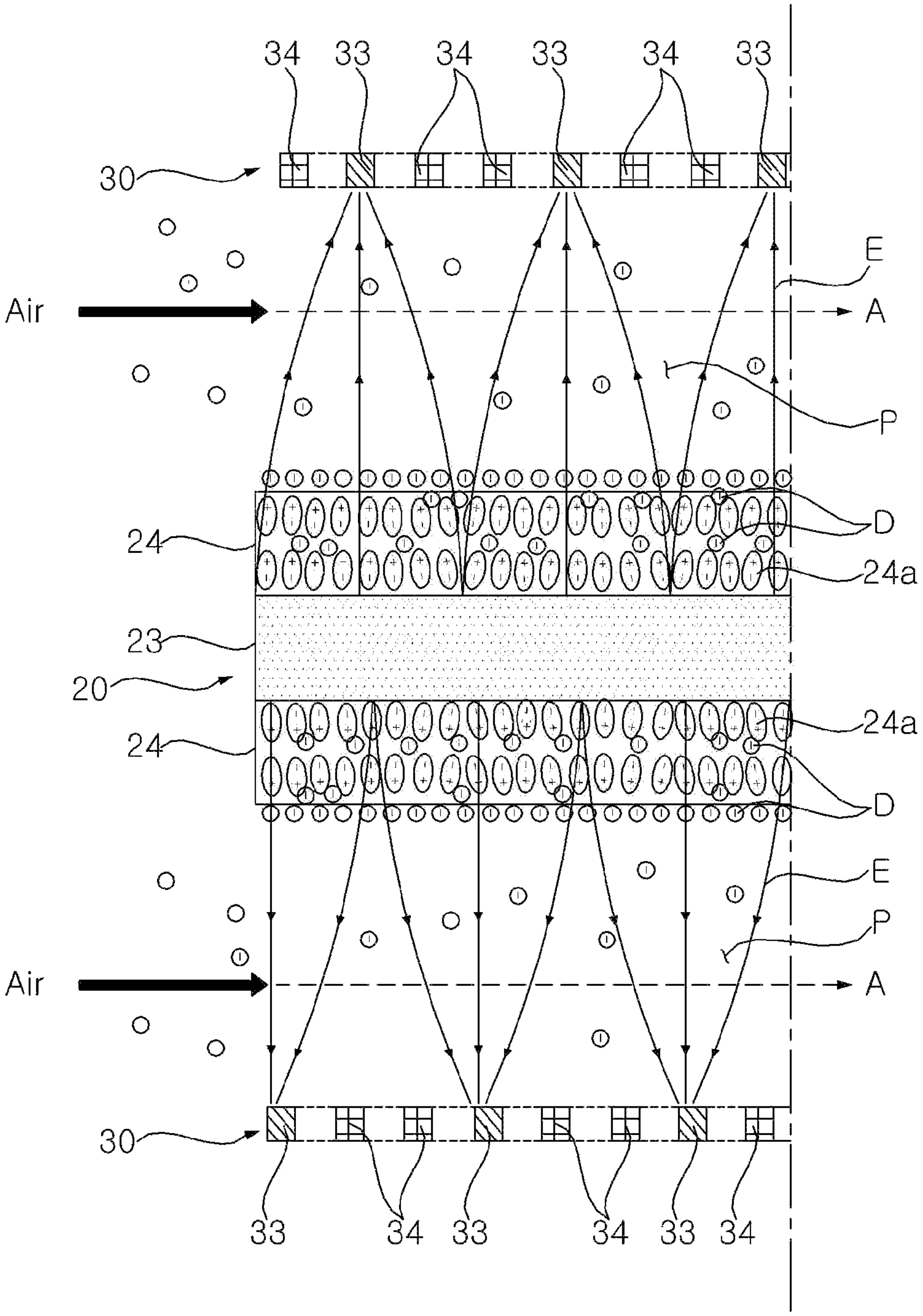

DUST COLLECTING FILTER

CROSS-REFERENCE TO RELATED PATENT APPLICATIONS

This application is a U.S. National Stage Application under 35 U.S.C. § 371 of PCT Application No. PCT/KR2021/009663, filed Jul. 26, 2021, which claims priority to Korean Patent Application No. 10-2020-0092070, filed Jul. 24, 2020, whose entire disclosures are hereby incorporated by reference.

TECHNICAL FIELD

The present invention relates to a dust collecting filter, and more particularly, to a dust collecting filter in which dust collection efficiency is increased through patterns and arrangements of electrodes.

BACKGROUND ART

In general, a dust collecting filter is a device that is attached to an air conditioner such as an air purifier, a cooler or a heater, and collects foreign substances such as dust contained in the air.

In general, a dust collecting filter generates an electric field through a voltage electrode to which a high voltage is applied and a counter electrode (ground electrode) grounded, and the electric field induces a dipole moment in a foreign substances in the air to polarize it, and then, the dust collecting filter collect the foreign substances through electrostatic attraction of electrodes. Such a dust collecting filter may used may collect foreign substances through the polarization force between polarized foreign substances and fiber particles by polarizing the fiber particles of the filter medium.

DISCLOSURE

Technical Problem

The problem to be solved by the present invention is to increase the efficiency of collecting foreign substances in the air by expanding the region where the electric field is activated.

Another problem to be solved by the present invention is to increase the efficiency of collecting foreign substances by increasing the area and strength of the electric field in preparation for the same pressure loss of the dust collecting filter.

Another problem to be solved by the present invention is to simplify the manufacturing process of the dust collecting filter.

The problems of the present invention are not limited to the problems mentioned above, and other problems not mentioned will be clearly understood by those skilled in the art from the following description.

Technical Solution

In order to achieve the above object, a dust collecting filter according to an embodiment of the present invention may include a ground electrode unit bent in a corrugated shape to form a plurality of bent portions and a plurality of flat portions between each of the plurality of bent portions, and grounded; and a plurality of voltage electrode units disposed between each of the plurality of flat portions and spaced apart from each other, and to which a high voltage is applied.

The voltage electrode unit may include a voltage electrode formed in a flat plate shape and disposed elongately in a longitudinal direction of the flat portion.

The voltage electrode unit may include a dielectric film disposed on both sides of the voltage electrode.

The plurality of voltage electrode units may be disposed parallel to each other.

One end of the voltage electrode unit may face to inner side of the bent portion, and the other end of the voltage electrode unit may be connected to a power source for applying a high voltage to the voltage electrode unit.

The ground electrode unit may include a plurality of ground electrodes forming a plurality of pores.

The ground electrode may be formed of a conductive thread.

The ground electrode unit may include a plurality of fibers crossing the ground electrode to form a plurality of pores.

The plurality of fibers may include a weft fibers arranged to cross the ground electrode; and a warp fibers arranged in parallel with the ground electrode.

Details of other embodiments are included in the detailed description and drawings.

Advantageous Effects

According to the dust collecting filter of the present invention, one or more of the following effects are provided.

First, since the ground electrode unit is bent in a corrugated shape and has a plurality of bent portions and a plurality of flat portions between each of the plurality of bent portions, and a plurality of voltage electrode units disposed between each of the plurality of flat portions and spaced apart from each other, as an electric field is activated not only between the flat portion and the voltage electrode unit, but also between the bent portion and the voltage electrode unit, the area for collecting foreign substances in the air may be wider through the electric field.

Second, since the ground electrode unit can be formed thinly, the area and strength of the electric field activated can be increased in preparation for the same pressure loss of the other dust collecting filter, and the efficiency of collecting foreign substances can be increased.

Third, the manufacturing process of the dust collecting filter can be simplified.

The effects of the present invention are not limited to the effects mentioned above, and other effects not mentioned will be clearly understood by those skilled in the art from the description of the claims.

BRIEF DESCRIPTION OF DRAWINGS

FIG. 1 is a cross-sectional view showing an air conditioner in which a dust collecting filter according to an embodiment of the present invention is installed.

FIG. 2 is a view showing the main configuration of a dust collecting filter according to an embodiment of the present invention.

FIGS. 3(*a*) and(*b*) are views showing the main configuration of the voltage electrode unit, which is the main configuration of the dust collecting filter according to an embodiment of the present invention.

FIG. 4 is a view showing enlarged view of the main configuration of the ground electrode part, which is the main configuration of the dust collecting filter according to an embodiment of the present invention.

FIGS. 5(*a*) to(*c*) are views showing the arrangement of main components of the ground electrode unit of FIG. 4.

FIG. 6 is a cross-sectional view of the dust collecting filter according to an embodiment of the present invention viewed from one side in a direction in which air flows.

FIG. 7 is a schematic diagram of a dust collecting filter according to an embodiment of the present invention collection dust.

MODE FOR INVENTION

Advantages and features of the present invention, and methods of achieving them, will become clear with reference to the embodiments described below in detail in conjunction with the accompanying drawings. However, the present invention is not limited to the embodiments disclosed below and may be implemented in various different forms, only the present embodiments make the disclosure of the present invention complete, and it is provided to completely inform the skilled in the art the scope of the present invention, and the present invention is only defined by the scope of the claims. same reference numbers designate same elements throughout the specification.

The spatially relative terms “below”, “beneath”, “lower”, “above”, “upper”, etc. can be used to easily describe components and their correlations with other components. Spatially relative terms should be understood as encompassing different directions of elements in use or operation in addition to the directions shown in the drawings. For example, if a component shown in the drawing is inverted, a component described as “below” or “beneath” another component can be placed “above” the other component. Thus, the exemplary term “below” may include directions of both below and above. Elements may be positioned facing other directions, and thus spatially relative terms may be interpreted according to orientation.

Terminology used herein is for describing the embodiments and is not intended to limit the present invention. In this specification, singular forms also include plural forms unless specifically stated otherwise in a phrase. As used herein, “comprises” and/or “comprising” do not exclude the presence or addition of one or more other components, steps and/or operations other than the stated components, steps and/or operations.

Unless otherwise defined, all terms (including technical and scientific terms) used in this specification may be used in a meaning commonly understood by those of ordinary skill in the art to which the present invention belongs. In addition, terms defined in commonly used dictionaries are not interpreted ideally or excessively unless explicitly specifically defined.

In the drawings, the thickness or size of each component is exaggerated, omitted, or schematically illustrated for convenience and clarity of explanation. Also, the size and area of each component do not entirely reflect the actual size or area.

Hereinafter, with reference to the accompanying drawings, a preferred embodiment of the present invention will be described.

Referring to FIG. 1, in an air conditioner 100 according to an embodiment of the present invention, a suction port I, a fan, and an outlet port O may be sequentially disposed along an air flow direction A. A dust collecting filter 10 and a heat exchanger H may be disposed between the suction port I and the discharge port O.

When the fan is operated, the air introduced through the inlet I may be heat-exchanged in the heat exchanger H and discharged through the discharge port O. At this time, the air introduced through the suction port I passes through the dust collecting filter 10 before being discharged through the discharge port O, and foreign substances in the air may be filtered.

The air conditioner 100 including the dust collecting filter 10 may include a filter housing (not shown) in which the dust collecting filter 10 is disposed. The filter housing may be installed to be detachable from the air conditioner 100 in a state in which the power of the air conditioner 100 is turned off.

The air conditioner 100 may include a power source 21 that applies a high voltage. The power source 21 may be connected to a controller (not shown), connected to one electrode of the dust collecting filter 10 to provide power, and connected to the other electrode to provide ground. When the fan operates, the power source 21 for applying a high voltage to the dust collecting filter 10 can be turned on, and the dust collecting filter 10 can collect foreign substances in the air flowing by the fan.

Hereinafter, referring to FIG. 2, the dust collection filter 10 according to an embodiment of the present invention may include a plurality of voltage electrode unit 20 to which a high voltage may be applied and a single of a ground electrode unit 30 grounded.

The ground electrode unit 30 may be bent in a corrugated shape, and may include a plurality of bent portions C and a plurality of flat portions F between each of the plurality of bent portions C. The plurality of voltage electrode units 20 may be spaced apart from each other between the plurality of flat portions F. A flow area P through which air passes may be formed between the ground electrode unit 30 and the voltage electrode unit 20.

The voltage electrode unit 20 may be connected to the power source 21 through the power line 22 to receive a high voltage. Also, the ground electrode unit 30 may be connected to the ground 31. When a high voltage is applied to the voltage electrode unit 20, an electric field may be generated between the voltage electrode unit 20 and the ground electrode unit 30. That is, when a high voltage of +polarity or −polarity is applied to the voltage electrode part 20, electric force is generated between the ground electrode part 30 connected to the ground 31 and having a zero potential, and foreign matter in the air passing through the flow area P can be charged (see FIG. 7). This will be described later.

The ground electrode unit 30 may be formed in a zigzag shape. That is, when two consecutive flat portions F are selected from among the plurality of flat portions F, a bent portion C may be formed on one side and an open portion OP may be formed on the other side.

The voltage electrode units 20 are formed in a flat plate shape and may be disposed parallel to each other. The voltage electrode units 20 may be disposed lengthwise along the longitudinal direction of the flat portions F between the plurality of flat portions F.

The voltage electrode units 20 may be disposed between the plurality of flat portions F. One end of the voltage electrode unit 20 may face the inner side of the bent portion C. The other end of the voltage electrode part 20 is exposed through the open portion OP and can be connected to the power supply 21 through the power line 22. At this time, since not only electric force is induced between both sides of the voltage electrode units 20 and the plurality of flat parts F, but also electric force is induced between one end of the voltage electrode units 20 and the bent part C, an area for collecting foreign substances through the electric field can be substantially increased.

Hereinafter, referring to FIGS. 2 and 3, The voltage electrode unit 20 of the dust collecting filter 10 according to an embodiment of the present invention may include a voltage electrode 23 to which a high voltage is applied and a dielectric film 24 disposed on both sides of the voltage electrode.

The dielectric film 24 may be disposed between the voltage electrode 23 and the flat portion F. The voltage electrode 23 may be formed in a flat plate shape, and the dielectric film 24 may be thinly coated on both sides of the voltage electrode. Instead of the dielectric film 24, a filter medium made of a thin dielectric material capable of forming pores and physically collecting foreign substances may be used.

The voltage electrodes 23 are formed in a flat plate shape and may be disposed parallel to each other. The voltage electrodes 23 may be disposed between the plurality of flat portions F along the longitudinal direction of the flat portion F.

The voltage electrode 23 may be disposed between the plurality of flat portions F. One end of the voltage electrode 23 may face the bent portion C, and the other end of the voltage electrode 23 may be exposed through the open portion OP, and may be connected to the power source 21 through the power line 22.

Meanwhile, when a high voltage is applied to the voltage electrode 23, an electric field may be generated between the voltage electrode 23 and the ground electrode part 30. At this time, a dipole moment is induced in the dielectric film 24 disposed between the voltage electrode 23 and the ground electrode unit 30, so that the particles of the dielectric film 24 can be polarized (see FIG. 7). In addition, the dielectric film 24 can prevent current due to contact between the voltage electrode 23 and the ground electrode 33.

Hereinafter, referring to FIGS. 4 and 5, the ground electrode unit 30 of the dust collection filter 10 according to an embodiment of the present invention may include a plurality of ground electrodes 33 connected to the ground 31. there is. For example, the plurality of ground electrodes 33 may be formed of conductive threads and cross each other to form a plurality of pores therebetween. The pores may be referred to air gaps.

Meanwhile, the ground electrode unit 30 may include a plurality of fibers 34 crossing the ground electrode 33 to form a plurality of the pores. The plurality of fibers 34 may cross each other to form the pores. For example, the plurality of fibers 34 may be formed in a mesh shape by crossing each other in a '+' shape.

The ground electrode 33 may be formed of a conductive thread and may be woven by crossing the plurality of fibers 34. As shown, the plurality of ground electrodes 33 woven on the plurality of fibers 34 may be arranged parallel to each other or may be arranged to cross each other. Since the ground electrode unit 30 including the ground electrode 33 and the fiber 34 is made of a flexible material, it can be easily bent into a corrugated shape by changing its shape.

Meanwhile, the plurality of fibers 34 may include a plurality of weft fibers 34*a* and a plurality of warp fibers 34*b*. The plurality of weft fibers 34*a* and the plurality of warp fibers 34*b* may be woven to cross each other to form the pores.

The plurality of ground electrodes 33 are woven by crossing the plurality of weft fibers 34*a* and the plurality of warp fibers 34*b*, so that the plurality of ground electrodes may be supported by the weft fibers 34*a* and the warp fibers 34*b*. since the use of the weft fibers 34*a* and the warp fibers 34*b* of high fineness, shaking of the ground electrode 33, which has low durability, can be prevented.

Between the plurality of ground electrodes 33, a plurality of inclined fibers 34*b* may be disposed parallel to the ground electrodes. Also, between the plurality of ground electrodes 33, a plurality of weft fibers 34*a* may be disposed to cross the ground electrodes. At this time, preferably, two warp fibers 34*b* may be disposed between each ground electrode 33.

The number of warp fibers 34*b* over the entire area of the ground electrode unit 30 may be greater than the number of weft fibers 34*a*. Preferably, the number of fibers per inch may be 80 warp fibers 34*b* and 50 weft fibers 34*a*.

The fineness of the warp fibers 34*b* may be higher than the fineness of the weft fibers 34*a*, and more specifically, the diameter Db of the warp fibers 34*b* may be greater than the diameter Da of the weft fibers 34*a*. In addition, as a quantitative unit, when using denier (DE, 1DE=1g to form a fiber of 9,000 m) as a unit of fineness, the fineness of the warp fibers 34*b* may be 70DE, the fineness of the weft fiber 34*a* may be 50DE.

FIG. 5 shows a method of weaving the fibers 34 on the ground electrode unit 30 disclosed in FIG. 4, FIG. 5(*a*) shows a plain weave method, FIG. 5(*b*) shows a twill weave method, and FIG. 5(*c*) shows a satin weave method.

Among them, plain weave is the most basic tissue in the fabric tissue, and refers to a tissue in which warp and weft yarns are alternately woven one by one, and the durability of the tissue is strong and the air permeability is good, which may be advantageous in reducing the differential pressure before and after the ground electrode unit 30.

Twill weave is a weaving method in which one, two or more warp or weft yarns are alternately intersected so that the tissue points (the part where the warp yarn protrudes forward) are diagonally visible. It has fewer tissue points than plain weave, so it is flexible and less wrinkled.

The satin weave is a weaving method that minimizes the number of warp and weft points as much as possible while making the surface of the fabric stand out only with the warp or weft. Compared to plain weave, it has the advantage of being more flexible and less prone to wrinkles.

The ground electrode unit 30 may be woven by all of the above three types of weaving methods, and considering the advantages of each weaving method, a weaving method suitable for the purpose of the ground electrode unit 30 may be selectively borrowed.

Hereinafter, referring to FIGS. 6 and 7, air may flow along the flow direction A of the air and pass through the flow area P of the dust collection filter 10 according to an embodiment of the present invention.

Foreign substances in the air passing through the flow area P is polarized by inducing a dipole moment in the electric field E acting between the voltage electrode unit 20 and the ground electrode unit 30, and the polarized foreign substances D may be collected in the voltage electrode unit 20 through electrostatic attraction with the voltage electrode 23 having a positive polarity or a negative polarity.

In addition, the particles 24*a* of the dielectric filter 24 may also be polarized so that one polarity of the particles 24*a* faces one direction. At this time, an electrostatic attraction between one polarity of the particle 24*a* of the polarized dielectric filter 24 and the opposite polarity of the polarized foreign substances D acts, and accordingly, the foreign substances may be collected in the voltage electrode unit 20.

At this time, the dielectric filter 24 has the advantage of being thin and reducing the pressure loss. In contrast, when a filter medium formed of a dielectric is used instead of the dielectric filter 24, pressure loss may increase, but there is an advantage in that an area capable of physically collecting foreign substances can be increased.

On the other hand, the plurality of ground electrodes 33 provided in the ground electrode unit 30 are formed of conductive yarns and are arranged parallel to each other and spaced apart from each other, and occupy a smaller area than the voltage electrodes. At this time, the ground electrode 33 may serve as a needle electrode. Therefore, when a voltage is applied to the voltage electrode 23, electric force acts intensively toward the ground electrode 33, which may induce a non-uniform electric field E. Compared to the uniform electric field, the non-uniform electric field E may cause the foreign substances D flowing along the air flow direction A to move irregularly. Therefore, the probability of being collected in the ground electrode unit 30 can be increased. Also, since the ground electrode 33 serves as a needle electrode, it is possible to ionize foreign substances by inducing corona discharge by adjusting the distance between the electrodes and the strength of the voltage.

In the above, the preferred embodiment of the present invention has been shown and described, but the present invention is not limited to the specific embodiment described above, various modifications can be made by those skilled in the art without departing from the subject matter of the present invention claimed in the claims, and these modifications should not be understood individually from the technical spirit or perspective of the present invention.

The invention claimed is:

1. A dust collecting filter including:

a ground electrode unit bent in a corrugated shape to form a plurality of bent portions and a plurality of flat portions between each of the plurality of bent portions, and grounded; and a plurality of voltage electrode units disposed between each of the plurality of flat portions and spaced apart from each other, and to which a voltage is applied, wherein one end of each of the voltage electrode units faces toward an inner side of one of the bent portions, and another end of the voltage electrode unit is connected to a power source that applies the voltage to the voltage electrode unit, and wherein the ground electrode unit is connected to a ground.

2. The dust collecting filter according to claim 1, wherein the voltage electrode unit includes a voltage electrode formed in a flat plate shape and disposed elongately in a longitudinal direction of the flat portion.

3. The dust collecting filter according to claim 2, wherein the voltage electrode unit includes a dielectric film disposed on both sides of the voltage electrode.

4. The dust collecting filter according to claim 1, wherein the plurality of voltage electrode units are disposed parallel to each other.

5. The dust collecting filter according to claim 1, wherein the ground electrode unit includes a plurality of ground electrodes forming a plurality of pores.

6. The dust collecting filter according to claim 5, wherein the ground electrode is formed of a conductive thread.

7. The dust collecting filter according to claim 5, wherein the ground electrode unit includes a plurality of fibers crossing the ground electrode to form a plurality of pores.

8. The dust collecting filter according to claim 7, wherein the plurality of fibers include:

a weft fibers arranged to cross the ground electrode; and a warp fibers arranged in parallel with the ground electrode.

* * * * *